(No Model.)  2 Sheets—Sheet 1.

G. SWEET.
MOWING MACHINE.

No. 244,947. Patented July 26, 1881.

Attest.
Jacob Spahn
John C. Burns

Inventor.
Geo. Sweet,
R. H. Osgood,
Atty.

(No Model.)  2 Sheets—Sheet 2.
G. SWEET.
MOWING MACHINE.
No. 244,947. Patented July 26, 1881.
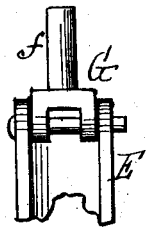
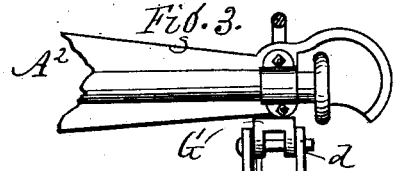
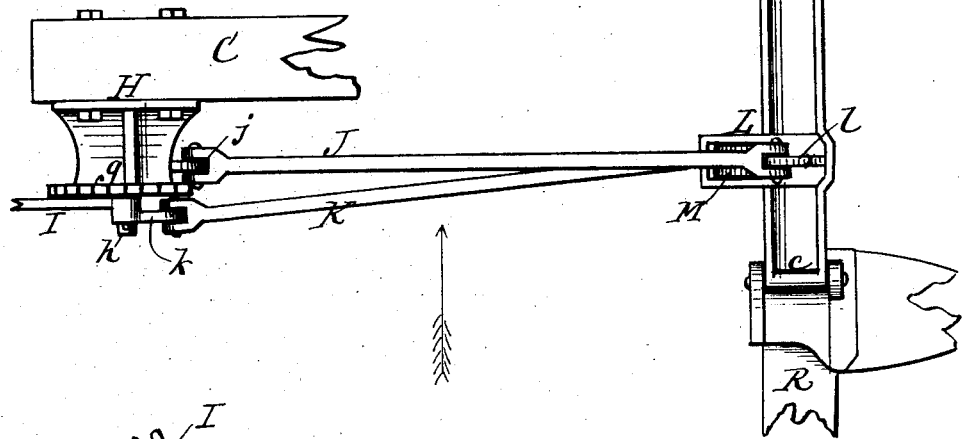
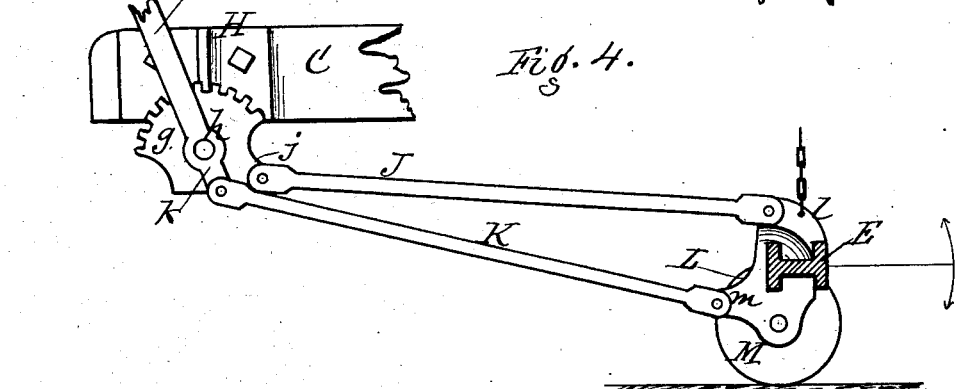
Attest.
Jacob Spahr
John C. Burns
Inventor.
Geo. Sweet,
R. F. Osgood,
Atty.

UNITED STATES PATENT OFFICE.

GEORGE SWEET, OF DANSVILLE, NEW YORK.

MOWING-MACHINE.

SPECIFICATION forming part of Letters Patent No. 244,947, dated July 26, 1881.

Application filed September 13, 1880. (No model.) Patented in Canada September 3, 1880.

*To all whom it may concern:*

Be it known that I, GEORGE SWEET, of Dansville, in the county of Livingston and State of New York, have invented certain new and useful Improvements in Mowing-Machines, of which the following is a specification.

My invention relates to improvements in mowers of the class in which are provided coupling-arms or connecting-bars having pivotal connections with cutting apparatus and doubly-jointed or two-way flexing connections with the main frames, so that the cutting apparatus may be vibrated vertically and tilted or rocked about their longitudinal axes; and my object mainly is to provide improved devices for rocking the cutting apparatus.

The subject-matter deemed novel will hereinafter be designated by the claims.

Figure 1:
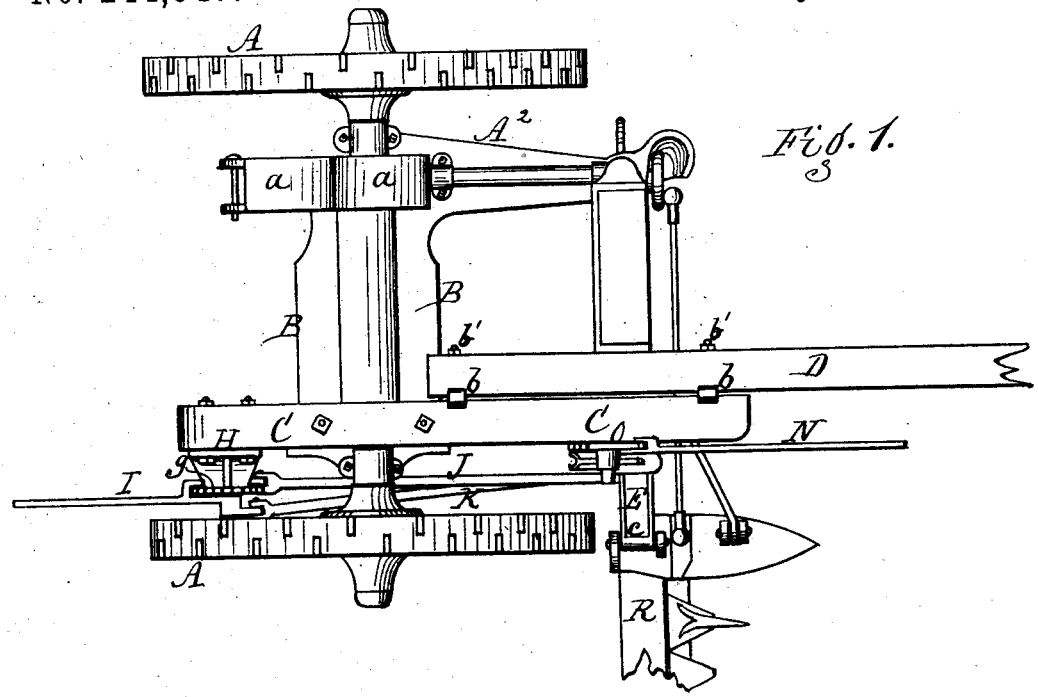
Figure 2:
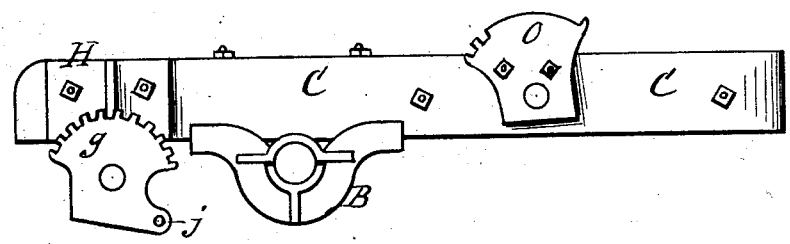

In the accompanying drawings, which show so much of a mower as is deemed necessary to illustrate my improvements as applied to a front-cut machine, Figure 1 is a plan or top view. Fig. 2 is a side elevation of a wooden frame-bar and its attachments. Fig. 3 is a plan or top view, showing the devices for tilting the finger bar or beam of the cutting apparatus. Fig. 4 is a side elevation of some of the parts shown by Fig. 3, with the coupling-arm in section. Fig. 5 is a detail view, showing the double joint for connecting the coupling-arm and main frame.

Those parts of a fully-organized machine which are not herein referred to may be of any well-known suitable construction.

An iron main frame, B, with boxing $a\,a$ for inclosing the gearing, is supported on the axle of the driving-wheels A A, and is provided at its front outer side (the side opposite that from which the cutting apparatus projects) with an arm, $A^2$, as usual. This arm supports the crank-shaft, and is provided with a bearing for a double joint or swivel-bolt for connecting the coupling-arm and main frame, as hereinafter described.

A wooden bar, C, is detachably but firmly secured crosswise of the axle over and upon the main frame B, at its inner side and near the inside driving-wheel. Flanges or a seat formed with the frame, and bolts and nuts, serve to secure the frame-bar to the main frame. (See Figs. 1 and 2.)

The pole D laps the wooden frame-bar for about half the length of this bar and along its vertical side next the frame-arm $A^2$. The pole is firmly and detachably secured to the wooden bar by means of clips or clamp-irons $b\,b$, the flanged ends or heads of which lap both the pole and bar at top and bottom and the bolts $b'\,b'$. (See Fig. 1.)

By employing the wooden bar C and adapting it and the frame to be firmly secured together there is avoided the unnecessary weight incident to the employment of metal to form inner front and rear extensions of the main frame for attachment of devices presently to be described. The frame as a whole is cheapened in construction, and is much less difficult to cast without the extensions for which the wooden bar is substituted than with them. Moreover, as will farther on be apparent, the strains resulting from the frequent sudden shocks incident to encountering obstacles by the cutting apparatus come first upon the wooden bar, and are then transferred to the metallic portion of the frame, close to the axle, where it is heavy and strong and much less liable to give way than would be the comparatively weak metallic arms or extensions.

The beam or finger-bar R of the cutting apparatus and the coupling-arm or connecting-bar E are pivoted together, as at $c$, and the heel end of the coupling-arm is doubly jointed to the main frame by the pivot $d$ and bolt G, whose journal $f$ rests and turns axially in the outer end of the extension or arm $A^2$ of the main frame.

As usual in machines of the class to which my improvements belong, the double-joint connection between the coupling-arm heel and main frame and the single-joint connection between the finger-beam and arm allow the cutting apparatus to rise and fall and to tilt axially or rock about the longitudinal axis of the finger-beam.

A metallic bracket or casting, H, is connected with the main frame through or by way of the wooden bar C, to the rear end of which it is attached. This depending bracket, thus located at the inner rear corner of the frame, is provided with a segmental cog-rack, g.

A hand-lever, I, is pivoted to turn about the stud h, and is provided with a pawl or detent to engage the teeth of the fixed rack g.

A brace-arm, J, is pivoted at its rear end to the casting H at j, and a connecting-rod, K, is pivoted to the lever I by a projecting arm, k, thereof.

A forked bracket or yoke, L, fast with the coupling-arm E, supports a ground wheel or roller, M, between its pendent forks and beneath the coupling-arm, at a point intermediate the finger-beam and heel end of the coupling-arm—say about one-third the length of the coupling-arm from the finger-beam heel.

The front end of the brace-arm J is pivoted to a flange or bearing, l, of the bracket L, above the coupling-arm, and the front end of the connecting-rod K is pivoted beneath the coupling-arm to an arm or bearing, m, of the yoke-bracket.

By means of the hand-lever I and the brace and rod, respectively connected above and below the center of the coupling-arm and directly to the roller-supporting bracket, which is rigid with the coupling-arm, it will readily be understood that the driver of the machine can raise or depress the points of the guards by rolling the coupling-arm and so tilting the finger-beam. The roller M moves slightly forward or backward, rolling on the ground and supporting the cutting apparatus at its inner end as the tilting-lever I is operated.

A lever, N, segment O, and suitable detent devices, and a chain connecting with the coupling-arm or rigidly-attached bracket thereof serve to raise and lower the finger-beam. This lever is supported near the front end of the wooden bar C of the main frame.

I do not claim, broadly, the combination of a doubly-jointed or vertically-vibrating and axially-rocking coupling-arm, a finger-beam hinged thereto, a finger-beam-supporting roller, a tilting-lever at the rear inner corner of the main frame, a brace-arm having jointed connection at its rear and front ends, respectively, with the rear inner corner of the main frame and with the coupling-arm, and a connecting-rod having jointed connection at its opposite ends with the tilting-lever and the coupling-arm. Nor do I unqualifiedly claim any of these elements separately or in combination, as such features and combinations of devices, broadly considered, are older than my invention. Neither do I broadly claim a mower main frame composed partly of metal and partly of wood, nor unqualifiedly the combination of a metallic main frame and a wooden frame-bar at the inner side thereof, such construction and combination, broadly considered, being older than my invention.

I claim as of my own invention—

1. The combination of the main frame provided with the arm $A^2$, the coupling-arm doubly jointed to said frame-arm and having jointed connection with the cutting apparatus, the bracket rigid with or fast on the coupling-arm, and having the flanges or bearings l and m, the one projecting above and the other below the coupling-arm, the brace-arm having direct jointed connection at its front end with one of said bearings, and the connecting-rod having similar jointed connection with the other of said bearings, as set forth.

2. The combination of the main frame, the coupling-arm doubly jointed thereto, the bracket or yoke rigidly attached to the coupling-arm intermediate its connections with the main frame and finger-beam, the roller mounted in said bracket beneath the coupling-arm, the tilting-lever, the bracket located at the inner rear corner of the frame, the brace-arm having pivotal connection at its opposite ends with the frame-bracket and with the coupling-arm bracket, and the connecting-rod, also having jointed connection at one end with the coupling-arm bracket and pivotal at its opposite end to the tilting-lever, these members being and operating substantially as hereinbefore set forth.

3. The combination of the main frame, the coupling-arm doubly jointed thereto, the finger-beam jointed to the coupling-arm, the forked bracket or yoke on the coupling-arm intermediate its ends, the roller mounted in said bracket beneath the coupling-arm, the brace-arm, and the connecting-rod, said brace-arm and connecting-rod having direct jointed connection with the bracket above and beneath the plane of the coupling-arm, substantially as and for the purpose hereinbefore set forth.

4. The combination of the metallic main frame, the wooden frame-bar fitted and bolted thereto at its inner side, near the axle, crosswise of which it extends to the front and rear, the pole connected to the front portion of the bar, and the tilting-lever and its co-operating devices supported by the rearwardly-projecting portion of the bar, as and for the purpose hereinbefore set forth.

In witness whereof I have hereunto signed my name in the presence of two subscribing witnesses.

GEORGE SWEET.

Witnesses:
　M. McCARTNEY,
　T. B. GRANT.